Sept. 10, 1929.  J. M. J. DORMOY  1,727,367
BRAKE CONTROLLING VALVE DEVICE
Filed Feb. 20, 1928
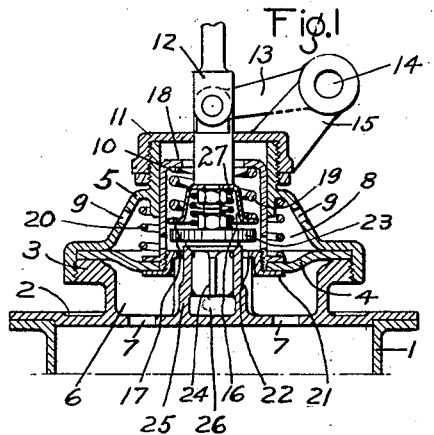
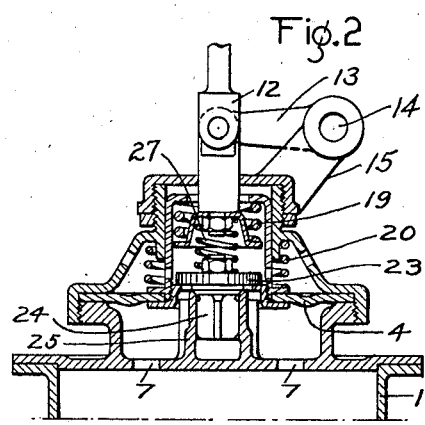
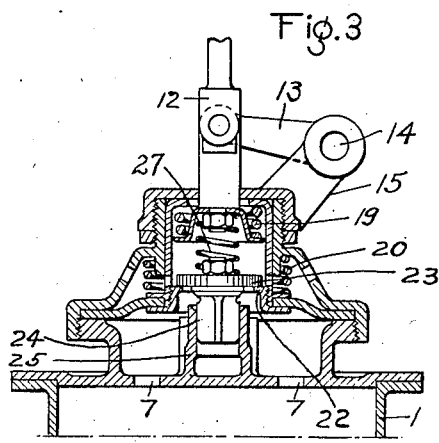
INVENTOR
JULES MARIE JOSEPH DORMOY
BY *Wm. N. Cady*
ATTORNEY Patented Sept. 10, 1929.

1,727,367

UNITED STATES PATENT OFFICE.

JULES MARIE JOSEPH DORMOY, OF PARIS, FRANCE, ASSIGNOR TO THE WESTINGHOUSE AIR BRAKE COMPANY, OF WILMERDING, PENNSYLVANIA, A CORPORATION OF PENNSYLVANIA.

BRAKE-CONTROLLING VALVE DEVICE.

Application filed February 20, 1928, Serial No. 255,702, and in France July 18, 1927.

This invention relates to control valves for fluid pressure braking apparatus and particularly although not exclusively to valves of this character adapted for use on automobile brakes operated by vacuum, the invention having for its object to provide an improved construction of control valve of the kind in which the pressure obtaining within the brake cylinder of the apparatus may be accurately and definitely graduated in accordance with the effort exerted upon the control element of the valve.

As usually constructed a control valve of the character above indicated comprises two valve elements, one of which is adapted to control communication between the brake cylinder of the apparatus and the induction pipe of the engine of the vehicle or a source of fluid under pressure, the other valve controlling communication between the brake cylinder and the atmosphere.

According to the principal feature of the invention the latter valve is constituted by a resilient element preferably in the form of a rubber or leather valve disc mounted upon the other valve which is preferably of the ordinary poppet type constructed of metal.

The invention is illustrated by way of example in the accompanying drawings, Figure 1 of which is a sectional view of a preferred construction of control valve embodying the invention and mounted upon one end of the brake cylinder, the various parts of the valve being shown in their released position, in which communication is established between the brake cylinder and the atmosphere. Figure 2 is a view similar to Figure 1 but illustrating the control valve in its lap position; Figure 3 being a similar view showing the valve in full application position.

Referring now to the drawings, it will be seen that the control valve is mounted on one end of the brake cylinder 1, the brake cylinder head 2 being formed integral with the lower body portion 3 of the control valve. A flexible diaphragm 4 constructed of any suitable material is interposed between the body portion 3 and an upper cap 5 of the control valve, the space 6 below the diaphragm 4 being in communication with the brake cylinder through suitable apertures 7 in the cylinder head 2, while the space 8 above the diaphragm 4 in the interior of the cap 5 is in communication with the atmosphere through ports 9.

The central part of the diaphragm 4 is secured to a cylindrical sleeve 10 adapted to slide within the upper portion of the cap 5, the outer end of which is closed by a cover 11 through which the control member 12 of the valve passes. The control member 12 is pivotally connected outside the cover 11 to one end of an arm 13 the opposite end of which is pivotally mounted as indicated at 14 on a bracket 15 secured to the cover 11.

The member 12 is thus guided and supported by the arm 13 and during its limited range of movement moves through an arc of relatively small extent. The lower end of the member 12 passes through the open end of the sleeve 10 and carries a conical collar 16 between the flanged edge 17 of which, and the inturned upper edge 18 of the collar 10 a cylindrical spring 19 is interposed. A second cylindrical spring 20 is interposed between the outwardly flanged lower edge of the sleeve 10 and the upper part of the cap 5. The sleeve 10 is secured to the diaphragm by means of a collar 21 which is screw-threaded on to the lower edge of the sleeve 10 so as to clamp the diaphragm 4 to the sleeve, an inner flange 22 on the collar 21 constituting the valve seat for a valve disc 23 composed of rubber, leather or other suitable material. The valve disc 23 is mounted on the upper end of a poppet valve 24 provided with a valve seat formed in the upper edge of a cylindrical projection 25 formed integral with the cylinder head 2, the space 26 within the cylindrical projection 25 being in communication with the induction pipe of the engine of the vehicle.

A light spring 27 is interposed between the collar 16 and the upper surface of the valve disc 23.

The operation of the control valve is as follows:—

So long as the parts of the valve are in the release position shown in Figure 1, the control member 12 being at the lowest point of its travel, the poppet valve 24 is in engagement with its seat in the cylindrical projection 25 and the diaphragm 4 being in its lowermost position the valve seat 22 on the collar 21 is out of engagement with the valve disc 23.

Communication between the brake cylinder and the atmosphere is thus established by way of ports 7, the space 6 below the diaphragm 4 past the open valve disc 23 and through the space 8 and the ports 9.

Assuming now that the control member 12 is moved upwards to the lap position, the valve member acting through the collar 16 and the spring 19 raises the sleeve 10 and with it the diaphragm 4 and the collar 21 against the action of the spring 20. In this position the valve seat 22 is in engagement with the valve seat 23 while the poppet valve 24 still remains in engagement with its valve seat. As a result the brake cylinder is closed, communication with the cylinder past the valve disc 23 being cut off.

Further upward movement of the control member 12 towards the position shown in Figure 3 causes the spring 19 to be further compressed to raise the sleeve 10 and the diaphragm 4 causing the poppet valve 24 to be lifted from its seat by the upward movement of the valve disc 23 to which the valve 24 is connected and as a result communication is established between the brake cylinder and the induction pipe of the engine past the open valve 24 to the space 26 within the cylindrical projection 25.

The vacuum conditions thus established within the brake cylinder tend to cause the diaphragm 4 to be moved downwards against the upward effort exerted by the controlling member 12 and when the vacuum established in the brake cylinder corresponds to the effort exerted on the member 12 the diaphragm 4 will move downwards to the position shown in Figure 2 thereby cutting off communication between the induction pipe and the brake cylinder and maintaining corresponding pressure conditions within the brake cylinder.

In the event of the effort on the control member 12 being decreased the diaphragm 4 will move upwards thus permitting the valve 24 to be seated and atmospheric air to be admitted to the brake cylinder past the valve disc 23 which is out of engagement with its valve seat 22.

The construction of the valve element controlling communication between the brake cylinder 1, and the atmosphere as above described, in the form of a resilient valve disc evidently permits a certain over-lap between the opening and closing action of the two valves so that during a limited range of movement of the control member 12 and of the diaphragm 4 both valves will remain closed thereby preventing pulsation and irregular action of the valves in operation.

The invention is evidently not limited to the precise constructional arrangement above described which may be varied in many respects without exceeding the scope of the invention.

Having now described my invention, what I claim as new and desire to secure by Letters Patent, is:

1. In a vacuum brake, the combination with a brake cylinder, of a valve for controlling communication from a vacuum source to the brake cylinder, a flexible valve for controlling communication from the atmosphere to said brake cylinder, and means for operating said valves.

2. In a vacuum brake, the combination with a brake cylinder, of a valve for controlling communication from a vacuum source to the brake cylinder, a valve of resilient material for controlling communication from the atmosphere to said brake cylinder, and means for operating said valves.

3. In a vacuum brake, the combination with a brake cylinder, of a valve for controlling communication from a vacuum source to the brake cylinder, a valve of rubber for controlling communication from the atmosphere to said brake cylinder, and means for operating said valves.

4. In a vacuum brake, the combination with a brake cylinder, of a metallic poppet valve for controlling communication from a vacuum source to the brake cylinder, a valve mounted on said metallic valve and formed of resilient material for controlling communication from the atmosphere to the brake cylinder, and means for operating said valves.

5. In a vacuum brake, the combination with a brake cylinder, of a metallic poppet valve for controlling communication from a vacuum source to the brake cylinder, a disk valve of flexible material mounted on said metallic valve for controlling communication from the atmosphere to the brake cylinder, and means for operating said valves.

In testimony whereof I have hereunto set my hand and seal this 4 day of February, 1928.

JULES MARIE JOSEPH DORMOY. [L. S.]